United States Patent [19]

Grot

[11] 4,433,082

[45] Feb. 21, 1984

[54] PROCESS FOR MAKING LIQUID COMPOSITION OF PERFLUORINATED ION EXCHANGE POLYMER, AND PRODUCT THEREOF

[75] Inventor: Walther G. Grot, Chadds Ford, Pa.

[73] Assignee: E. I. Du Pont de Nemours and Company, Wilmington, Del.

[21] Appl. No.: 259,506

[22] Filed: May 1, 1981

[51] Int. Cl.$^3$ .............................................. C08D 5/20
[52] U.S. Cl. .................................... 524/755; 521/28; 521/27; 524/757; 524/761; 524/765; 524/766; 524/767
[58] Field of Search .................. 521/28; 528/494, 495, 528/499, 482, 501; 524/544

[56] References Cited

U.S. PATENT DOCUMENTS

| | | | |
|---|---|---|---|
| 2,580,325 | 12/1951 | Scott | 521/30 |
| 2,641,008 | 10/1934 | Grim | 528/482 |
| 3,282,875 | 11/1966 | Connolly et al. | 260/29.6 |
| 3,301,893 | 1/1967 | Putnam et al. | 260/513 |
| 3,321,445 | 5/1967 | Lazerte et al. | 260/75 |
| 3,341,366 | 9/1967 | Hodgdon et al. | 136/86 |
| 3,558,744 | 1/1971 | Michaels et al. | 521/28 |
| 3,684,747 | 8/1972 | Coalson et al. | 521/30 |
| 3,692,569 | 9/1972 | Grot | 117/138.8 UF |
| 3,853,720 | 12/1974 | Korach et al. | 204/98 |
| 3,853,721 | 12/1974 | Darlington et al. | 204/98 |
| 4,038,213 | 7/1977 | McClure et al. | 252/430 |
| 4,052,475 | 10/1977 | McClure et al. | 260/672 T |
| 4,056,578 | 11/1977 | McClure et al. | 260/683.47 |
| 4,060,565 | 11/1977 | McClure et al. | 260/671 C |
| 4,065,515 | 12/1977 | McClure et al. | 260/683.68 |
| 4,165,440 | 8/1979 | Kim | 568/867 |
| 4,174,426 | 11/1979 | Asami | 521/30 |
| 4,259,226 | 3/1981 | Luhara et al. | 260/33.4 F |

FOREIGN PATENT DOCUMENTS

| | | |
|---|---|---|
| 905036 | 7/1972 | Canada. |
| 55-149336 | 11/1980 | Japan. |
| 588590 | 5/1947 | United Kingdom. |
| 1286859 | 8/1972 | United Kingdom. |

OTHER PUBLICATIONS

Boundy & Boyer, "Styrene, its Polymers, Copolymers and Derivatives", p. 680, Reinhold, 1952.
Solomon, "The Chemistry of Organic Film Farmers", pp. 287-291, Wiley 1967.

Primary Examiner—Joseph L. Schofer
Assistant Examiner—Peter F. Kulkosky

[57] ABSTRACT

A process is provided for making a liquid composition of a perfluorinated polymer having sulfonic acid or sulfonate groups in a liquid medium by contacting the polymer with a mixture of 25 to 100% by weight of water and 0 to 75% by weight of a second liquid component such as a lower alcohol, e.g., propanol or methanol, at a temperature of at least 180° C. (at least 240° C. when about 90% to 100% water is used), in a closed system. The liquid composition made by this process, or modified liquid products prepared therefrom, are used in coating various substrates, in casting films, and in repairing perfluorinated ion exchange films and membranes. The process is also useful in recovering perfluorinated polymer having sulfonic acid or sulfonate groups from scrap and used articles made of such polymer or containing such polymer as a component part thereof.

34 Claims, No Drawings

PROCESS FOR MAKING LIQUID COMPOSITION OF PERFLUORINATED ION EXCHANGE POLYMER, AND PRODUCT THEREOF

BACKGROUND OF THE INVENTION

Fluorinated ion exchange polymers having as the functional groups sulfonic acid groups or a salt thereof are now well known in the art. They find numerous uses, e.g., as the membrane in electrochemical cells such as fuel cells and electrolytic cells such as chloroalkali cells; as the catalyst for many chemical reactions; and in other varied permselective processes such as reverse osmosis and ultrafiltration.

Ordinarily these polymers are fabricated into the desired product by melt processing while the polymer is still in the form of a melt-fabricable precursor wherein the functional groups are —$SO_2X$ where X is F or Cl, preferably —$SO_2F$, and then the —$SO_2X$ groups are converted to ion exchange form. There are, however, many times when it is desirable to use a liquid composition containing a polymer for fabricating a product to be prepared.

There are known in the art some solutions of some of the fluorinated polymers with sulfonyl groups. For examples, solutions of such polymers having the functional groups still in the —$SO_2F$ form in a perhalogenated liquid or in a perhalogenated liquid which contains a sulfonyl fluoride or a carboxylic ester group, as disclosed in U.S. application Ser. No. 176,595 filed Aug. 8, 1980, now U.S. Pat. No. 4,348,310. However, most such solvents are expensive and uncommon, and many are difficult to make.

Also known in the art are solutions of fluorinated polymers having low equivalent weight and the functional groups in the form of sulfonic acid, sulfonamide or sulfonate groups, in an organic solvent which will form a solution in water containing at least 5% by weight of the organic solvent, as disclosed in British Patent Specification No. 1,286,859. However, the solutions prepared therein are all of polymers having an equivalent weight below 1000, and the specific disclosure therein of polymers having at least 14 mole % of the repeating unit containing the functional group corresponds to an equivalent weight no greater than 1060. Such solutions of higher equivalent weight polymers of this kind cannot be made.

It would be of advantage to have available liquid compositions of higher equivalent weight fluorinated polymers having sulfonic acid or sulfonate groups. It is desirable to have the functional groups as sulfonic acid or sulfonate groups so that —$SO_2X$ groups do not have to be hydrolyzed after fabrication of the article to be prepared. It is often desirable to have the higher equivalent weight polymers inasmuch as they swell less than the lower equivalent weight polymers when in contact with aqueous media.

It is therefore a principal object of this invention to provide a process for making a liquid composition which contains therein a fluorinated polymer of higher equivalent weight having sulfonic acid or sulfonate groups, and the liquid composition made by this process.

Another object is to provide a liquid composition of the higher equivalent weight sulfonate polymers useful for coating various substrates, casting film, and repairing defective membranes of similar polymers.

Other objects will become apparent hereinbelow.

SUMMARY OF THE INVENTION

Briefly, according to the invention, there is provided a process for making a liquid composition of a fluorinated ion exchange polymer having sulfonic acid or sulfonate groups and an equivalent weight of about 1025 to about 1500 in a liquid medium, which comprises contacting the polymer with water or a mixture of water and a selected compound such as a lower alcohol, at between 180° and 300° C., and below the critical temperature(s) of the component(s) of the liquid medium, in a closed vessel.

More specifically, in one aspect of the invention, there is provided a process for making a liquid composition of a perfluorinated ion exchange polymer having —$SO_3M$ functional groups wherein M is H, Na, K or $NR_4$, and each R is separately H, $CH_3$ or $C_2H_5$, in a liquid medium, said liquid composition being liquid at room temperature, said process comprising contacting a said polymer having an equivalent weight in the range of 1025 to 1500 with a mixture comprising 20 to 90% by weight of water and 10 to 80% by weight of at least one member of the group consisting of methanol, ethanol, n-propanol, isopropanol, n-butanol, 2-butanol, 2-methoxyethanol, 2-ethoxyethanol, ethylene glycol dimethyl ether, ethylene glycol diethyl ether, diethylene glycol dimethyl ether, diethylene glycol diethyl ether, dioxane and acetonitrile at a temperature in the range of about 180° to 300° C. and below the critical temperature(s) of said member(s) employed, for at least 0.5 hour in a closed vessel, and separating from said liquid composition any lower density liquid phase present.

In another aspect of the invention there is provided the liquid composition prepared by such process.

In yet other aspects of the invention there are provided (a) a process for making a coated article and the article so made, (b) unsupported membrane, and (c) a process for repairing defective membrane and repaired membrane so made, all with the use of the liquid composition.

There is also provided a process for separating fluorinated polymers which contain sulfonic acid or sulfonate groups from fluorinated polymers which do not contain such groups, e.g., polymers which contain carboxyate groups.

DETAILED DESCRIPTION OF THE INVENTION

The sulfonyl polymer with which the present invention is concerned is typically a polymer having a fluorinated hydrocarbon backbone chain to which are attached the functional groups or pendant side chains which in turn carry the functional groups. The pendant side chains can contain, for example,

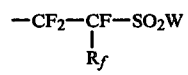

groups wherein $R_f$ is F, Cl, or a $C_1$ to $C_{10}$ perfluoroalkyl radical, and W is F or Cl, preferably F. Ordinarily, the functional group in the side chains of the polymer will be present in terminal

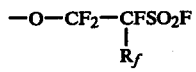

groups. Examples of fluorinated polymers of this kind are disclosed in U.S. Pat. No. 3,282,875, U.S. Pat. No. 3,560,568 and U.S. Pat. No. 3,718,627. More specifically, the polymers can be prepared from monomers which are fluorinated or fluorine substituted vinyl compounds. The polymers are made from at least two monomers, with at least one of the monomers coming from each of the two groups described below.

At least one monomer is a fluorinated vinyl compound such as vinyl fluoride, hexafluoropropylene, vinylidene fluoride, trifluoroethylene, chlorotrifluoroethylene, perfluoro (alkyl vinyl ether), tetrafluoroethylene and mixtures thereof. In the case of copolymers which will be used in electrolysis of brine, the precursor vinyl monomer desirably will not contain hydrogen.

The second group is the sulfonyl-containing monomers containing the precursor group

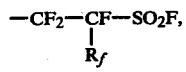

wherein $R_f$ is as defined above. Additional examples can be represented by the general formula $CF_2=CF-T_k-CF_2SO_2F$ wherein T is a bifunctional fluorinated radical comprising 1 to 8 carbon atoms, and k is 0 or 1. Substituent atoms in T include fluorine, chlorine, or hydrogen, although generally hydrogen will be excluded in use of the copolymer for ion exchange in a chloralkali cell. The most preferred polymers are free of both hydrogen and chlorine attached to carbon, i.e., they are perfluorinated, for greatest stability in harsh environments. The T radical of the formula above can be either branched or unbranched, i.e., straight-chain, and can have one or more ether linkages. It is preferred that the vinyl radical in this group of sulfonyl fluoride containing comonomers be joined to the T group through an ether linkage, i.e., that the comonomer be of the formula $CF_2=CF-O-T-CF_2-SO_2F$. Illustrative of such sulfonyl fluoride containing comonomers are

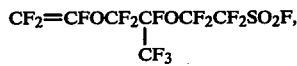

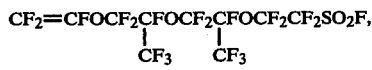

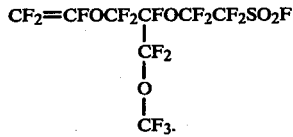

The most preferred sulfonyl fluoride containing comonomer is perfluoro (3,6-dioxa-4-methyl-7-octenesulfonyl fluoride),

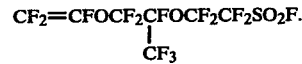

The sulfonyl-containing monomers are disclosed in such references as U.S. Pat. No. 3,282,875, U.S. Pat. No. 3,041,317, U.S. Pat. No. 3,718,627 and U.S. Pat. No. 3,560,568.

A preferred class of such polymers is represented by polymers having the repeating units

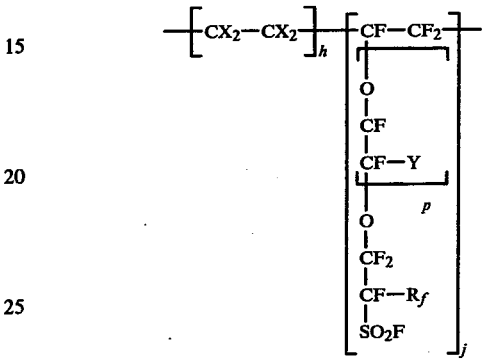

wherein
h is 3 to 15,
j is 1 to 10,
p is 0, 1 or 2,
the X's taken together are four fluorines or three fluorines and one chlorine,
Y is F or $CF_3$, and
$R_f$ is F, Cl or a $C_1$ to $C_{10}$ perfluoroalkyl radical.

A most preferred copolymer is a copolymer of tetrafluoroethylene and perfluoro (3,6-dioxa-4-methyl-7-octenesulfonyl fluoride).

Such copolymers used in the present invention can be prepared by general polymerization techniques developed for homo- and copolymerizations of fluorinated ethylenes, particularly those employed for tetrafluoroethylene which are described in the literature. Nonaqueous techniques for preparing the copolymers include that of U.S. Pat. No. 3,041,317, that is, by the poylmerization of a mixture of the major monomer therein, such as tetrafluoroethylene, and a fluorinated ethylene containing a sulfonyl fluoride group in the presence of a free radical initiator, preferably a perfluorocarbon peroxide or azo compound, at a temperature in the range 0–200° C. and at pressures in the range of $10^5$ to $2 \times 10^7$ pascals (1–200 Atm.) or higher. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethyl-cyclobutane, perfluorooctane, perfluorobenzene and the like, and inert, liquid chlorofluorocarbons such as 1,1,2-trichloro-1,2-2-trifluoroethane, and the like.

Aqueous techniques for preparing the copolymer include contacting the monomers with an aqueous medium containing a free-radical initiator to obtain a slurry of polymer particles in non-water-wet or granular form, as disclosed in U.S. Pat. No. 2,393,967, or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. No. 2,559,752 and U.S. Pat. No. 2,593,583.

The term "perfluorinated" as used herein refers to the backbone chain of the polymer and the side chains which carry the —$SO_3M$ functional groups, but does not refer to the M group which can be replaced by ion exchange, and can be, e.g., $NH_4$ or $N(CH_3)_4$.

Surprisingly, a way to prepare liquid compositions of perfluorinated polymers having sulfonic acid or sulfonate groups and having equivalent weights in the range of 1025 to 1500, in an aqueous liquid medium containing at least 20% by weight of water has now been found. The process of making the liquid compositions is relatively fast, and is capable of providing fairly concentrated compositions, containing in excess of 10% by weight of the polymer.

The process of the invention for making a liquid composition of such polymer having —$SO_3M$ functional groups wherein M is H, Na, K or $NR_4$, and each R separately is H, $CH_3$ or $C_2H_5$, in a liquid medium comprises contacting said polymer having an equivalent weigth in the range of 1025 to 1500 with a mixture of at least 20% by weight of water and the balance, if another component is present, is at least one second liquid component which is a member of the group consisting of methanol, ethanol, n-propanol, isopropanol, n-butanol, 2-butanol, 2-methoxyethanol, 2-ethoxyethanol, ethylene glycol dimethyl ether, ethylene glycol diethyl ether, diethylene glycol dimethyl ether, diethylene glycol diethyl ether, dioxane and acetonitrile, at a temperature in the range of about 180° C. to about 300° C., preferably above 200° C., for at least about 0.5 hour in a closed vessel. When the mixture employed in the process comprises 20 to 90% by weight of water and 10 to 80% by weigth of second liquid, the temperature employed will also be below the critical temperature of each said member (second liquid component) employed. When the process comprises contacting the polymer with water only, the temperature employed will be at least 240° C., but below 300° C. When the mixture employed in the process comprises about 90 to 99% by weight of water and 1 to 10% by weight of second liquid, the temperature employed will be in the range of 240 to 300° C. The liquid composition made by the process is liquid at room temperature. Contacting of the polymer with water and second liquid component is ordinarily done with agitation, generally by rocking or shaking of a closed pressure vessel, because agitation results in faster formation of the liquid composition.

In the process, especially when the polymer is in the —$SO_3H$ form, any second liquid employed may undergo side-reactions such as isomerization, olefin formation and ether formation. Some of the alcohols may give ethers which are liquids which are not totally miscible with water. In such case, the process may yield not only the liquid composition of polymer in a liquid medium, but also a second, lower density, liquid phase consisting predominantly of ethers and alcohols. Any such lower density liquid phase present can be separated from the desired liquid composition and discarded or recycled to the process.

Although ethylene glycol will form a liquid composition with the polymer therein upon heating at 230° C. for 3 hours, it suffers the disadvantages of a high boiling point and slow rate of evaporation, and, with polymer in the sulfonic acid form, of forming acetaldehyde and condensation polymer derived therefrom.

At the higher temepratures employed in the process, when the polymer employed is a quartenary ammonium salt —$SO_3NR_4$, such salt may break down, such that the polymer in the resulting liquid composition may be in the form of a tertiary ammonium salt —$SO_3NHR_3$.

The polymer employed in the process can be in any of a variety of forms, e.g., fluff, cubes, tubing, coating on a substrate, or be part or all of a film or membrane.

For polymer in the upper part of the indicated equivalent weight range, i.e., about 1250 to 1500, some fractionation of the polymer may occur in the process, that is, not all of the polymer may dissolve. When all of the polymer does not dissolve, the undissolved part of the polymer is ordinarily removed from the desired liquid composition, e.g., by filtering or centrifuging.

The process is especially useful for polymers having an equivalent weight in the range of 1050 to 1250, and even more especially for those in the range of 1100 to 1250, inasmuch as little or no solid polymer remains to be removed. It was not previously possible to prepare a liquid composition of polymer having such equivalent weight using a mixture containing 20% by weight or more of water. For polymer in this range, a contacting temperature in the range of 210 to 250° C. is preferred, and the range of 210 to 230° is especially good, as there is less side-reaction such as ether formation than at higher temperatures.

A particularly good mixture to use in the process is 30 to 50% by weight of water and 50 to 70% by weight of n-propanol or isopropanol. When such a mixture is used with a polymer in the —$SO_3H$ form, some of the propanol isomerizes, and the various propyl ethers form in side-reactions. In such a case, the lower density liquid phase which contains the propanols and propyl ethers can be separated from the desired liquid composition and recycled to the process.

Another particularly good mixture to use in the process is 30 to 70% by weight of water, 15 to 35% by weight of n-propanol, and 15 to 35% by weight of methanol.

Ordinarily, for each part by weight of polymer employed in the process, from as little as about 4 or 5 parts by weight up to about 50 or even 100 parts by weight, preferably about 10 parts by weight, of water, or water in combination with at least one second liquid component, is employed.

In the instant process for making a liquid composition, there is an interaction between the equivalent weight of the polymer employed, the temperature of the process, and the amount and nature of the liquid mixture employed. For higher equivalent weight polymers, the temperature employed is ordinarily higher, the amount of liquid mixture employed is usually greater, and the amount of second liquid component in the liquid mixture is usually higher.

The instant process is also applicable to polymers largely as described above but which contain, in addition to —$SO_3M$ functional groups, other functional groups in amount which do not interfere with formation of the desired liquid composition. Such other functional groups could be, for example, —$SO_2F$ groups which may have remained unhydrolyzed during conversion of precursor polymer having —$SO_2F$ groups to polymer having —$SO_3M$ groups. Such other functional group could also be, as another example, —COOQ functional groups where Q is H, lower alkyl of 1 to 4 carbon atoms, Na, K or $NR_4$ where each R separately is H, $CH_3$ or $C_2H_5$, in the case of terpolymers synthesized as described above but further including a fluorinated vinyl monomer having carboxylic functionality. However, when Q is Na, K or $NR_4$, while some decarboxylation may occur, the polymer will nevertheless go into the liquid composition.

The liquid composition formed in the process of the invention consists essentially of about 2 to 18% by weight of polymer and 82 to 98% by weight of a liquid medium. When a second liquid component is used in the process, the liquid medium contains water and the second liquid component or components employed, and may also contain small amounts of by-products derived from the second liquid component (s), e.g., when an alcohol is used, isomers and ethers derived from the alcohol may be formed. When the process comprises contacting the polymer with water only, the liquid composition obtained can contain up to about 10% by weight of the polymer in water; polymer having an equivalent weight toward the lower end of the range will form compositions containing up to about 10% by weight of the polymer, and polymer having an equivalent weight in the upper part of the equivalent weight range will form only less concentrated compositions when the compositions are at room temperature. It is, of course, possible to prepare more dilute liquid compositions than those indicated by the process of the invention, but it is usually uneconomic to do so in view of the large amounts of liquid medium which would be handled relative to the amount of polymer. A particular benefit of the invention is that it has not heretofore been possible to prepare liquid compositions in water containing 2% or more of such polymer.

The exact nature of the liquid compositions formed by the instant process is not understood. They have some characteristics of a true solution, and simultaneously some characteristics of a dispersion or aquasol. They are clear and viscous, which are characteristics of a solution. Although by electron microscopy no particles were detected, X-ray diffraction indicates the presence of particles with diameters on the order of 0.005 micron (50 Angstrom units), and light scattering indicates the presence of even larger particles having molecular weights on the order of 40,000,000, which latter characteristics are not those of a solution. Upon centrifugation, no solid separates out. The liquid compositions are not pH sensitive, i.e., the polymer does not agglomerate if the pH is raised or lowered. They are also unaffected by boiling. Upon dilution of a more concentrated composition, there is a delayed affect on viscosity; a more fluid (or less viscous) composition first forms, but upon continued mixing it then increases in viscosity (but remains less viscous than before dilution).

Although the liquid compositions as first prepared have numerous uses which will be described in detail below, it is believed that they contain micelles, because attempts to prepare films therefrom have yielded only poor films, in some cases with a mud-cracked pattern. However, the liquid compositions can be modified to other liquid products from which good, clear films can be made.

One way of modifying the liquid composition is to add another substance to it, which substance will assist in formation of non-mud-cracked films. For example, to a liquid composition obtained from the instant process, following cooling to below about 100° C., can be added a substance such as triethyl phosphate or dimethylsulfoxide in an amount to constitute 10 to 200% by weight based on the polymer. Alternatively, a substance such as 2-ethyoxyethanol can be added in an amount to constitute 4 to 60% by volume of the resulting liquid product.

Another way of modifying the liquid compositions is first to remove therefrom a portion of the water and at least a portion of the second liquid component employed by vaporization, most often by boiling or distilling, and then adding n-propanol to form a liquid product in a modified liquid medium, 25 to 40% by weight of said modified liquid medium being water. This liquid product can be even further modified by then adding to it a substance such as triethyl phosphate, dimethylsulfoxide or 2-ethoxyethanol, in amounts as specified in the previous paragraph.

Addition of a modifier such as those set forth in the two previous paragraphs apparently prevents premature gel formation during drying when a film is cast from one of the liquid products prepared by modifying the liquid composition, and serves to improve the physical properties of the film so made. Residual triethyl phosphate or other modifier or hydrolysis products thereof remaining in such cast film is easily leached from the film by washing with water.

One use of the liquid compositions so made, and of the liquid products prepared therefrom by modification as described above, is for making coated articles by applying the liquid composition or liquid product to a substrate, followed by drying. The substrate can be any of a wide variety, including a fabric, especially a fabric made at least in part of perhalocarbon fibers or glass fibers; an ion exchange membrane; or a porous diaphragm, in this latter case for the purpose of converting the porous diaphragm to a nonporous membrane-like article. The coated articles so made can be used in various liquid permeation processes, such as reverse osmosis, ultrafiltration, and electrolysis, especially electrolysis of aqueous sodium chloride solution. One advantage of the invention is that it provides a way of making an article having a substrate of fabric of glass fibers coated with a high equivalent weight polymer of the type dealt with herein; such a product cannot be made with solutions of high equivalent weight polymer having $-SO_2F$ groups, as the caustic employed to hydrolyze the $-SO_2F$ groups destroys the glass fibers.

The liquid compositions and liquid products can also be used to coat a catalyst support, such as wire mesh, and ceramic of any shape desired. Such catalyst is useful in catalyzing alkylations, ether formation and a host of other chemical reactions.

Liquid products modified by addition of a substance which suppresses mud-cracking as described above are useful for casting unsupported membrane. Such unsupported membrane is useful for the same liquid permeation processes set forth above, and is suitably in the form of flat sheet or tubing.

Another use of the liquid compositions, and of the liquid products made therefrom by modification, is in repairing a perfluorinated ion exchange membrane which leaks at a defective portion thereof by applying to the defective portion either the liquid composition or the liquid product, followed by drying. Such a technique is ordinarily suitable for defects such as pinholes, abraded areas and other minor defects. For larger defects such as cuts, rips, holes, etc., repair may best be made with use of a patch. In such a case, the repair process comprises the steps of (a) providing a patch of membrane material of perfluorinated ion exchange polymer similar to that surface of the membrane to which the patch is to be applied, and of a size to cover the defective area to be repaired (b) applying to at least one of (i) the defective area of the membrane or (ii) the patch, either the above-mentioned liquid composition or liquid product, (c) covering the defective area with the patch, (d) pressing the patch against the membrane at a temperature below the melting point of each perfluorinated ion exchange polymer present in the membrane and the patch, and (e) heating the patch and membrane to evaporate at least part of the liquid medium of the liquid composition or liquid product. In this case, the liquid composition or liquid product functions as an adhesive.

Still another use of the liquid compositions and of the liquid products made therefrom by modification, is as a binder. For example, a slurry of asbestos fibers therein can be made and cast into a sheet. The resulting sheet has a greatly improved wet strength over a sheet prepared from an asbestos slurry in water. Such a sheet is useful as a separator between the anode and cathode compartments of a chloralkali cell.

In reference to both the liquid compositions and the liquid products made therefrom by modification, those wherein the polymer is in sulfonic acid form have an advantage over those wherein the polymer is in sulfonate salt form, in that films of good properties are more readily prepared from those in sulfonic acid form. On the other hand, those wherein the polymer is in sulfonate salt form have an advantage over those wherein the polymer is in sulfonic acid form, in that ether formation from any second liquid component is essentially nil when the polymer is in sulfonate salt form. Accordingly, another aspect of the invention is that wherein a polymer having $-SO_3M'$ functional groups wherein $M'$ is Na, K or $NR_4$ where each R separately is H, $CH_3$ or $C_2H_5$, is first incorporated into a liquid composition as described herein, and then this first liquid composition is brought into contact with a cation exchange resin in acid form to convert the first liquid composition into a second liquid composition wherein the functional groups of the polymer are $-SO_3H$ groups. The step of contacting with a cation exchange resin is conveniently done by passing the first liquid composition through a column packed with the resin. This aspect of the invention has the advantages that ether formation from any second liquid component used in the first contacting step is suppressed, and the second liquid composition formed by ion exchange is the better for casting films and making coatings.

Another aspect of the invention is the separation of a perfluorinated ion exchange polymer having $-SO_3M$ functional groups wherein M is H, Na, K, or $NR_4$, and each R is separately H, $CH_3$ or $C_2H_5$, and having an equivalent weight in the range of 1025 to 1250 (first polymer), from a perfluorinated ion exchange polymer having $-COOQ$ functional groups wherein Q is H or lower alkyl, suitably alkyl of 1 to 4 carbon atoms, Na, K, or $NR_4$ where each R separately is H, $CH_3$ or $C_2H_5$, and having an equivalent weight in the range of 600 to 2000 (second polymer), which comprises contacting material which contains both the first and second polymers with a liquid consisting essentially of 20 to 100% by weight of water and 0 to 80% by weight of at least one second liquid component set forth hereinabove, at a temperature at least 200° C. and below the critical temperature of each component member of said liquid for at least 0.5 hour in a closed vessel, and separating a liquid composition containing said first polymer from any undissolved solid. By virtue of such a separation, it is possible to recover the polymer which contains sulfonic acid or sulfonate groups for reuse.

It is preferred to carry out this separation when Q is H or lower alkyl, and most preferred when Q is lower alkyl, so as to preclude decarboxylation of the carboxylic polymer at the temperature employed for the separation and loss of a valuable carboxylic polymer. It should be understood, however, that even if the process is carried out with carboxylic polymer where Q is Na, K or $NR_4$ and at a temperature at which decarboxylation occurs either partially or completely, separation with nevertheless be accomplished; the sulfonic polymer will still be recovered, but with loss of the carboxylic polymer. If one has a material which contains second polymer where Q is Na, K or $NR_4$ in association with first polymer, and desires to recover both the first and second polymers without decarboxylation, it is a simple matter to convert the second polymer to the carboxylic ester form by subjecting the mixed material to an esterification, e.g., with an alcohol and an acid. It is noted, however, that in such a process during the heating step, carboxylic ester groups may be hydrolyzed, and when an alcohol is also used, carboxylic acid groups may be esterified and carboxylic ester groups may be transesterified.

This separation process is suitable for separating first polymer having sulfonic functionality from second polymer having carboxylic functionality in the case of films which contain at least one layer of each type of polymer, and in the case of membranes which contain at least one layer of each type of polymer and a reinforcing member. Such film and membrane could suitably be scrap from a manufacturing process, film or membrane damaged before use, or film or membrane which has been employed as an ion exchange barrier in an electrochemical process such as electrolysis of brine. The separation process is also suitable for use with a mixture of the first and second polymers.

In this separation process, it is suitable to separate the liquid composition containing sulfonic polymer (first polymer) from solids by filtration at ordinary temperatures at atmospheric pressure, or at the elevated temperature of the process while still under pressure. Centrifugation is also suitable. If the separation process is carried out with water only as the liquid, use of flammable second liquid and the expense of the second liquid can be avoided; in this case, as some first polymer with sulfonic functionally may deposit out as solid from the liquid composition upon cooling, filtration at elevated temperature under pressure can be advantageous.

It should be apparent that when other insoluble polymer such as a polytetrafluoroethylene fabric reinforcing member is present along with the sulfonic and carboxylic polymers, it will remain with the carboxylic polymer as part of the solid, thus permitting separation of polymer with sulfonic functionality from it as well.

Equivalent weights specified hereinabove and in the Examples are those determined by titration of the polymer in the free acid form with standard aqueous sodium hydroxide solution. This determination is accurate only to about ±25 equivalent weight units.

To further illustrate the innovative aspects of the present invention, the following examples are provided.

In the examples, abbreviations are used as follows:

PTFE refers to polytetrafluoroethylene;

TFE/EVE refers to a copolymer of tetrafluoroethylene and methyl perfluoro (4,7-dioxa-5-methyl-8-nonenoate);

TFE/PSEPVE refers to a copolymer of tetrafluoroethylene and perfluoro (3,6-dioxa-4-methyl-7-octenesulfonyl fluoride);

EW refers to equivalent weight.

EXAMPLE 1

Into a shaker tube were place 300 ml of n-propanol, 200 ml of water, and 40 g of TFE/PSEPVE having an EW of 1100, the functional groups having been hydrolyzed to —SO$_3$Na form, and the polymer itself being in the form of powder. The shaker tube was closed, heated at 240° C. for 18 hours while being shaken, and cooled. There was obtained 481 ml of a clear liquid composition having a density of 0.93 g/ml and a viscosity of 12.5 centistokes. No residual solid polymer remained. The presence of colloidal particles having a size of about $5 \times 10^{-3}$ microns (50 Angstrom units) was indicated by X-ray diffraction.

Films of moderate strength were obtained by casting portions of the liquid composition and heating at temperatures of 60 to 90° C.

EXAMPLE 2

Into a shaker tube were placed 200 ml of n-propanol, 500 ml of water, and 30 g of TFE/PSEPVE having an EW of 1100, the functional groups having been hydrolyzed to —SO$_3$H form, and the polymer being in the form of powder. The shaker tube was closed, heated at 220° C. for 3 hours while being shaken, and cooled. There was obtained 430 ml of a higher density, lower phase which is the liquid composition of the invention and which contained a small amount of undissolved gel, and 37 ml of a lower density, upper phase which was predominantly dispropyl ethers and which was discarded. About 10 ml of the liquid medium was distilled from 100 ml of the liquid composition, and analysis of the distillate by gas chromatography and infrared examination indicated the presence therein of about 40% by weight of n-propanol, 25% by weight of isopropanol, and 35% by weight of water.

EXAMPLE 3

Into a shaker tube were placed 500 ml of n-propanol, 400 ml of methanol, 1000 ml of water, and 200 g of TFE/PSEPVE having an EW of 1100, the functional groups having been hydrolyzed to —SO$_3$H form, and the polymer being in the form of powder. The shaker tube was closed, heated at 220° C. for 3 hours while being shaken, and cooled. There was obtained 1441 ml of a higher density, lower phase which is the composition of the invention, and which had a density of 1.018 g/ml and a viscosity of 111 centistokes, and 62 ml of a lower density, upper phase which was discarded. No residual solid polymer remained. To the liquid composition, triethyl phosphate was added to constitute 110% by weight of the polymer in the resulting liquid product. Film obtained by casting a portion of this liquid product and heating gradually from 90° C. to 120° C. had a yield strength of $8.32 \times 10^6$ pascals (1207 psi), a tensile strength of $1.77 \times 10^7$ pascals (2567 psi), and 292% ultimate elongation.

EXAMPLE 4

To a portion of the liquid product of Example 3 was added an amount of 2-ethyoxyethanol to constitue 50% by volume of the resulting modified liquid product.

Some porous alumina catalyst support pellets (Norton SA 5205) were placed in a flask, the flask was evacuated to a pressure of about 2000 pascals (15 mm of mercury), and a sufficient amount of the above modified liquid product was introduced into the flask to cover the pellets. The vacuum was released, so that the liquid product was drawn into the pores of the pellets. Evacuation to 2000 pascals and release of the vacuum to atmospheric pressure was carried out three more times. The excess liquid product was removed, and the coated pellets were dried at 50° C. One of the dry, coated pellets was broken into pieces, and examination of the interior portion of the pellet with a microscope indicated uniform coating of the interior surfaces of the pellet.

EXAMPLE 5

Pieces of several sheet structure were impregnated with the modified liquid product of Example 4, and gradually heated from 50° C. to 75° C. The sheet structures used were (1) a fabric of polytetrafluoroethylene fibers, (2) a fabric of a 50:50 blend of poly-para-phenylene terephalamide staple fibers and poly-meta-phenylene isophthalamide staple fibers, (3) a fabric of glass fibers, (4) a sheet of asbestos fibers, and (5) a microporous polytetrafluoroethylene sheet having a microstructure of nodes interconnected by fibrils (as described in U.S. Pat. No. 3,962,153 and commercially available under the trademark Gore-Tex from W. L. Gore & Associates, Inc.)

EXAMPLE 6

A defective cation exchange membrane having a layer of TFE/PSEPVE hydrolyzed to —SO$_3$Na form as one component layer thereof, and having a pinhole therein, was repaired by applying to the pinhole a drop of the modified liquid product of Example 4, and gradually heating it from 50° C. to 75° C.

EXAMPLE 7

Into a shaker tube were placed 300 ml of n-propanol, 50 ml of methanol, 350 ml of water, and 50 g of scrap membrane which had one layer of TFE/PSEPVE in —SO$_3$H form and having an EW of 1100, one layer of TFE/EVE in —COOCH$_3$ form and having an EW of 1050, and a reinforcing fabric of PTFE fibers embedded therein, said membrane being cut in approximately 1.3 × 1.3 cm pieces. The shaker tube was closed, heated at 210° C. for 18 hours while being shaken, and cooled. Three phases were recovered from the shaker tube, two liquid and one solid. The solid phase was recovered by draining the total product through a fritted glass funnel, and was the undissolved TFE/EVE copolymer and reinforcement fabric. The heavier, lower liquid phase (368 ml) was a liquid composition of the invention having a density of 0.94 g/ml and containing approximately 6 g of the TFE/PSEPVE copolymer per 100 ml of the liquid composition. The lighter, upper liquid phase (172 ml) was discarded. The solid phase on the filter was washed with hot methanol, and 29 g of a conglomerate of agglomerated TFE/EVE polymer layer and PTFE fibers was obtained. Some of the agglomerated TFE/EVE polymer was manually separated from the PTFE fibers, and was pressed into a clear, tough film; by infrared analysis, no sulfonate component could be detected in this film.

EXAMPLE 8

A bag was made from pieces of tightly woven PTFE fabric, using strips of a tetrafluoroethyl/hexafluoropropylene copolymer to heat seal the seams of the bag. Before the final seal on the bag was made, 50.66 g a TFE/PSEPVE copolymer hydrolyzed to —SO$_3$H form, having an EW of 1100, and in the form of 10 to 35 mesh powder, was placed inside the bag. The sealed bag containing the sulfonic acid copolymer was placed in a vacuum oven first at 60° C. for 5 hours, then at room temerature for 2 days, and underwent loss of 2.50 g of moisture, indicating that the weight of dry sulfonic acid copolymer was 48.16 g.

The sealed bag of polymer was placed in a shaker tube, along with 200 ml of water. The pressure vessel was sealed and heated to 240 to 255° C. for 100 hours with agitation; the pressure at 240° C. was $2.5 \times 10^6$ pascals (370 psi) and at 255° C. was $3.25 \times 10^6$ pascals (470 psi). The vessel was then cooled to room temperature, at which point the pressure in the vessel was $1.7 \times 10^5$ pascals (25 psi). Upon discharging the contents of the vessel, there was found (1) a viscous liquid composition of the invention containing gelled pieces of sulfonic acid copolymer, and (2) the PTFE bag (which was undamaged) with some polymer still inside it and a polymer film on the outside of the bag. The PTFE bag and contents was washed with hot water, dried at 50° C. and weighted; only 15.8 g of sulfonic acid copolymer remained in the bag.

The viscous liquid composition was separated from the gelled polymer with the aid of a fritted glass funnel. The weight of the gelled pieces, the content of the bag and the film on the outside of the bag, after drying, indicated that 14.4 g of the sulfonic acid copolymer remained at room temperature in the viscous liquid composition obtained, i.e., approximate 7.2 g/100 ml of the liquid composition. Films cast from the liquid composition in water were brittle. However, upon addition of some n-propanol to a portion of the liquid composition in water, strong films were cast.

The film of sulfonic acid which formed on the outside of the bag, after drying, had good mechanical properties.

The presence of both the sulfonic acid copolymer film on the outside of the bag, and the gelled pieces of sulfonic acid copolymer in the liquid outside the bag, shows that at the elevated temperatures during the heating step, the concentration of copolymer in the liquid composition was even greater than 7.2 of copolymer/100 ml of liquid composition, and that some of the copolymer reformed to solid upon cooling.

EXAMPLE 9

Into a shaker tube were placed 325 ml of 2-ethoxyethanol, 175 ml of water, and 40 g of TFE/PSEPVE having an EW of 1120, the functional groups having been hydrolyzed to —SO$_3$K form, the polymer being in the form of cubes. the shaker tube was closed, heated to 230° C. for 3 hours while being shaken, and cooled. There was obtained a first clear liquid composition; none of the solid polymer cubes remained, but a small amount of filmy pieces were removed by filtering. Evaporation of a 20 ml portion of the filtered liquid composition to dryness yielded 1.668 g of polymer residue, which indicates a concentration of 8.34 g of polymer/100 ml of liquid composition.

Into a flask was placed 250 ml of the above first liquid composition containing copolymer in —SO$_3$K form. A tube of TFE/PSEPVE copolymer, 3 m (10 ft) in length, 0.76 mm (30 mils) in diameter, wall thickness of 0.13 mm (5 mils), 1100 EW, in the —SO$_3$H form, was coiled and inserted into the flask, with both ends protruding from the neck of the flask. A solution consisting of 20 ml of concentrated hydrochloric acid, 50 ml of water, and 130 ml of 2-ethoxyethanol was prepared, and was allowed to flow slowly through the inside of the tube by gravity while stirring the liquid composition. Samples (20 ml each) of the effluent from the tube were collected at intervals, boiled to dryness, and the KCl obtained weighed; from the first, second, and last such samples there was obtained, respectively, 0.133 g, 0.043 g and 0.029 g of KCl. In this way the first liquid composition charged to the flask was converted to a second liquid composition wherein the functional groups of the polymer were substantially changed to —SO$_3$H by ion exchange.

A portion of the second liquid composition was cast and heated to 100° C. to prepare a strong film.

COMPARATIVE EXAMPLES A-E

In each of these examples, 10 g of TFE/PSEPVE which had been hydrolyzed to either —SO$_3$K form (Examples A, B, C) or —SO$_3$H form (Examples D, E), having an EW as specified in Table I, in the form of film 100 microns thick, was placed in 100 g of liquid medium as specified in Table I, and heated under reflux for 4 hours. After cooling, the amount of polymer in the liquid phase was determined by evaporating a 50 ml sample to dryness and weighing the residue. The results are shown in Table I. In most cases the amount dissolved was negligible, and at most was 0.54% by weight.

TABLE I

| Ex. | TFE/PSEPVE Form | EW | Liquid Medium* | Polymer Dissolved (% by wt.) |
|-----|------|------|----------------|------|
| A | K | 1050 | 95 g E/5 g W | 0.01% |
| B | K | 1050 | 100 g E | 0.006% |
| C | K | 1050 | 100 g IP | 0.01% |
| D | H | 1050 | 80 g IP/20 g W | 0.54% |
| E | H | 1300 | 100 g E | 0.04% |

*E = ethanol, W = water, IP = isopropanol

COMPARATIVE EXAMPLE F

To 100 g of water was added 10 g of TFE/PSEPVE which had been hydrolyzed to —SO$_3$Na form, having an EW of 1050, in the form of film 100 microns thick, and the mixture was stirred and heated at 68° C. for 3 hours. After cooling, the amount of polymer in the liquid phase was determined by evaporating a 50-ml portion to dryness and weighing the residue. The liquid phase contained only 0.022% by weight of polymer.

EXAMPLE 10

Into a shaker tube were placed 500 ml of n-propanol, 1000 ml of water, 400 ml of methanol, and 200 g of TFE/PSEPVE having an EW of 1100, the functional groups having been hydrolyzed to —SO$_3$H groups. The shaker tube was closed, heated at 220° C. for 3 hours while being shaken, and cooled. The lower density upper phase (155 ml) was separated and discarded. The higher density lower phase (1590 ml, density 1.01 g/ml) was heated to boiling to reduce the water content by distillation, during which procedure, 850 ml of n-propanol and 450 ml of n-butanol were added in portions, so as to maintain the volume of the liquid composition between 1200 and 1500 ml at all times. The final modified liquid composition obtained (1400 ml) had a density of 0.98 g/ml and a viscosity of 25 centistokes.

Silicon carbide catalyst support pellets (spheres, 8 mm diameter, Norton SC 5232) were placed in a portion of the above modified liquid composition for several minutes to soak up the liquid composition, and the pellets were then drained and dried by gradually heating from 120° C. to 150° C. for 5 hours. By determining the increase in weight it was found that the pellets contained 3.36% by weight of the hydrolyzed TFE/P-SEPVE copolymer (H form).

In a flask were placed 24.75 g of the coated catalyst pellets, 18.25 g of dimethyl adipate, and 181 ml of water, and the mixture was stirred and heated at 100° C. for 1 hour and cooled. The amount of carboxylic acid groups formed by catalytic hydrolysis was determined by titration with 0.1N aqueous NaOH solution to be 25.6 meq.

EXAMPLE 11

Into a shaker tube was placed 180 ml of n-propanol, 150 ml of methanol, 350 ml of water, and 40 g of TFE/PSEPVE having an EW of 1100, which had been hydrolyzed to —$SO_3H$ form, and in the form of powder. The tube was closed, heated to 230° C. for 3 hours while being shaken, and cooled. There was obtained 420 ml of a higher density phase, the liquid composition of the invention (density 0.995 g/ml), and 43 ml of a lower density phase (upper phase K).

The same procedure was carried out with 200 ml of n-propanol, 150 ml of methanol, 350 ml of water, and 60 g of the same polymer, and heating was at 220° C. for 3 hours, to give 548 ml of higher density phase (density 1.00 g/ml, viscosity 51 centipoises), and 82 ml of lower density phase (upper phase L).

The same procedure was carried out with 200 ml of n-propanol, 150 ml of methanol, 350 ml of water, and 40 g of the same polymer, and heating was at 230° C. for 3 hours, to give 543 ml of higher density phase (density 0.989 g/ml), and 48 ml of lower density phase (upper phase M).

A procedure to recycle the by-product upper phases was carried out as follows.

Into a shaker tube were placed 450 ml of water, upper phases K, L and M, and 40 g of TFE/PSEPVE having an EW of 1200, which has been hydrolyzed to —$SO_3H$ form. The tube was closed, heated to 220° C. for 3 hours, and cooled. There was obtained 368 ml of a higher density lower phase (density 1.003 g/ml) which contained an undissolved sludge which was separated, dried, and found to weigh 4.6 g, and additionally 10 ml of lower density upper liquid phase which was discarded. Thus, recycling was successful, in that it provided 368 ml of a liquid composition which contained approximately 35 g of the polymer.

EXAMPLE 12

Into a shaker tube were placed 300 ml of n-propanol, 50 ml of methanol, 300 ml of water, and 30 g of TFE/P-SEPVE having an EW of 1200, the functional groups having been hydrolyzed to —$SO_3H$ form, the polymer being in the form of 35-60 mesh powder. The tube was closed, heated to 230° C. for 4 hours while being shaken, and cooled. There was obtained 190 ml of lower density upper phase which was discarded, and 380 ml of higher density lower phase (density 1.00 g/ml). No residual solid polymer remained.

An 80-portion of the higher density phase was boiled to distill some of the water from it, while simultaneously gradually adding 50 ml of n-propanol, until a final volume of 35 ml was reached. Then 15 ml of 2-ethoxyethanol was added to prepare a modified liquid product.

A piece of film of TFE/PSEPVE having an EW of 1100, a thickness of 125 microns (5 mils), into which was embedded a reinforcement fabric (the fabric having 16 400-denier PTFE threads/cm in both warp and weft in a plain weave), and having the functional groups hydrolyzed to —$SO_3Na$ form, was first soaked in n-propanol, then coated on one side (opposite side from that in which the fabric was embedded) with the above modified liquid product, and dried, to prepare a coated membrane.

A piece of the coated membrane was mounted between the compartments of a small chloralkali cell with the coated side toward the cathode compartment, and saturated aqueous sodium chloride solution was electrolyzed at a current density of 2.0 ASI (amps/squre inch) at 80° C. The cell was operated for 18 days to produce 20% by weight caustic at a voltage of 3.5-3.7 volts at a current efficiency of 68%.

EXAMPLES 13-34 AND COMPARATIVE EXAMPLES G, H AND J

Into a shaker tube were placed quantities of water and/or other liquid components, and TFE/PSEPVE in amount and having EW and form, all as specified in Table II. The tube was closed, heated for a time and at a temperature as specified in Table II. The results, as to whether or not all polymer dissolved, the amount and concentration of the liquid composition obtained, and in some cases the viscosity, are also given in Table II.

TABLE II

| | TFE/PSEPVE | | | LIQUID COMPONENTS | | | CONDI-TIONS | | RESULTS | | | |
| | | | | total vol. | water vol. | other component(s)* | | | all polymer dissolved | g per 100 ml | | viscosity |
| Ex. | g | EW | form | ml | % | vol. % and kind | °C. | hours | | | ml | centistokes |
|---|---|---|---|---|---|---|---|---|---|---|---|---|
| 13 | 51 | 1100 | H | 200 | 100 | | 250 | 100 | no | 7 | | |
| 14 | 25 | 1100 | H | 600 | 100 | | 235 | 18 | no | 2 | | |
| 15 | 40 | 1100 | Na | 500 | 40 | 60 NP | 240 | 18 | yes | 8 | 481 | 12.5 |
| 16 | 30 | 1200 | H | 650 | 46 | 46 NP + 8 N | 230 | 4 | yes | 8 | 380 | |
| 17 | 30 | 1500 | H | 650 | 46 | 46 NP + 8 N | 230 | 18 | no | 4 | 380 | |
| 18 | 25 | 1350 | H | 650 | 47 | 38 NP + 15 N | 235 | 18 | no | 4.5 | 360 | |
| 19 | 60 | 1100 | H | 600 | 42 | 33 NP + 25 N | 220 | 3 | yes | 11 | 548 | 51 |
| 20 | 40 | 1100 | H | 600 | 83 | 17 NB | 220 | 3 | no | 6 | 480 | |
| 21 | 40 | 1100 | H | 450 | 56 | 44 E | 180 | 3 | no | 7 | 300 | |
| 22 | 200 | 1100 | H | 1900 | 53 | 26 NP + 21 N | 220 | 3 | yes | 13 | 1575 | 150 |

TABLE II-continued

| | LIQUID COMPONENTS | | | | | | CONDITIONS | | RESULTS | | | |
|---|---|---|---|---|---|---|---|---|---|---|---|---|
| | TFE/PSEPVE | | | total vol. | water vol. | other component(s)* | | | all polymer | g per | | viscosity |
| Ex. | g | EW | form | ml | % | vol. % and kind | °C. | hours | dissolved | 100 ml | ml | centistokes |
| 23 | 30 | 1100 | H | 700 | 71 | 29 NP | 220 | 3 | no | 6 | 430 | |
| 24 | 40 | 1100 | K | 500 | 40 | 60 NP | 240 | 18 | yes | 8 | 505 | 19 |
| 25 | 40 | 1100 | K | 500 | 40 | 60 DG | 240 | 18 | yes | 8 | | 10 |
| 26 | 70 | 1100 | K | 500 | 40 | 60 G | 235 | 18 | no | 12 | | |
| 27 | 50 | 1120 | K | 500 | 44 | 56 EC | 240 | 18 | yes | 10 | | 12 |
| 28 | 40 | 1100 | H | 450 | 56 | 44 E | 180 | 3 | no | 7 | | |
| 29 | 40 | 1120 | K | 500 | 40 | 60 A | 230 | 3 | no | 6 | | |
| 30 | 40 | 1120 | K | 500 | 40 | 60 D | 230 | 3 | no | 2 | | |
| 31 | 40 | 1120 | K | 500 | 20 | 80 EC | 230 | 3 | no | 1.5 | | |
| 32 | 40 | 1120 | K | 500 | 35 | 65 EC | 230 | 3 | yes | 8 | | |
| 33 | 50 | 1120 | K | 500 | 44 | 56 EC | 240 | 18 | yes | 10 | | |
| 34 | 40 | 1120 | K | 500 | 20 | 80 MC | 230 | 3 | no | 6 | | |
| G | 20 | 1200 | H | 425 | 6 | 94 E | 170 | 18 | no | 1.2 | | |
| H | 40 | 1120 | K | 500 | | 100 EC | 230 | 3 | no | 0.2 | | |
| J | 40 | 1120 | K | 550 | 10 | 90 EC | 230 | 3 | no | 0.4 | | |

*NP = n-propanol,
N = methanol,
NB = n-butanol,
E = ethanol,
DG = diglyme (diethylene glycol dimethyl ether),
G = glyme (ethylene glycol dimethyl ether),
EC = ethyl cellosolve (ethylene glycol monoethyl ether),
A = acetonitrile,
D = dioxane,
MC = methyl cellosolve (ethylene glycol monoethyl ether)

INDUSTRIAL APPLICABILITY

The present invention is highly beneficial in that it provides a fast process for making liquid compositions not heretofore available which are useful in many industries. The liquid compositions and modified liquid products made by the process can be used in making and repairing films and membranes useful in various liquid premeation processes such as chloralkali electrolysis, in coating substrates such as catalyst support for use in promoting a wide variety of chemical reactions, and in recovering scrap or used perfluorinated polymer having sulfonic acid or sulfonate functional groups for re-use.

I claim:

1. A process for making a liquid composition of a perfluorinated ion exchange polymer having —SO₃M functional groups wherein M is H, Na, K or NR₄, and each R is separately H, CH₃ or C₂H₅, in a liquid medium, said liquid composition being liquid at room temperature, said process comprising contacting a said polymer having an equivalent weight in the range of 1025 to 1500 with a mixture comprising 20 to 90% by weight of water and 10 to 80% by weight of at least one member of the group consisting of methanol, ethanol, n-propanol, isopropanol, n-butanol, 2-butanol, 2-methoxyethanol, 2-ethoxyethanol, ethylene glycol dimethyl ether, ehtylene glycol diethyl ether, diethylene glycol dimethyl ether, diethylene glycol diethyl ether, dioxane and acetonitrile at a temperature in the range of about 180° to 300° C. and below the critical temperature(s) of said member(s) employed, for at least 0.5 hour in a closed vessel, and separating from said liquid composition any lower density liquid phase present.

2. The process of claim 1 wherein said liquid composition consists essentially of 2 to 18% by weight of said polymer and 82 to 98% by weight of said liquid medium.

3. The process of claim 2 wherein said polymer, prior to said contacting, is in the form of fluff, cubes, tubing, coating on a substrate, or at least a portion of film or membrane.

4. The process of claim 3 wherein said polymer has an equivalent weight in the range of 1050 to 1250.

5. The process of claim 4 wherein said temeprature is in the range of 210° to 250° C.

6. The process of claim 5 wherein said mixture consists essentially of 30 to 50% by weight of water and 50 to 70% by weight of n-propanol.

7. The process of claim 5 wherein said mixture consists essentially of 30 to 70% by weight of water, 15 to 35% by weight of n-propanol and 15 to 35% by weight of methanol.

8. The process of claim 5 which further comprises, following said contacting, cooling said liquid composition to below 100° C., and adding to said liquid composition triethyl phosphate or dimethylsulfoxide in an amount to constitute 10 to 200% by weight of said polymer, to form a liquid product.

9. The process of claim 5 which further comprises, following said contacting, cooling said liquid composition to below 100° C., and adding to said liquid composition 2-ethoxyethanol in an amount to constitute 4 to 60% by volume of the resulting liquid product.

10. The process of claim 1 which further comprises, following said contacting, removing from said liquid composition by vaporization a portion of said water and at least a portion of said at least one member, and then adding n-propanol to form a liquid product of said polymer in a modified liquid medium, 25 to 40% by weight of said modified liquid medium being water.

11. The process of claim 10 which further comprises, following said removing, also adding triethyl phosphate or dimethylsulfoxide in an amount to constitute 10 to 200% by weight of said polymer.

12. The process of claim 10 which further comprises, following said removing, also adding 2-ethoxyethanol in an amount to constitute 4 to 60% by volume of the resulting liquid product.

13. The process of claim 1, 2, 3, 4, 5, 6, 7, 8, 9, 10, 11 or 12, wherein said polymer is a copolymer of tetrafluoroethylene and perfluoro (3,6-dioxa-4-methyl-7-octenesulfonyl fluoride) whose sulfonyl fluoride groups have been converted to said —SO$_3$M functional groups.

14. The process of claim 1 wherein said polymer has an equivalent weight greater than 1250, said process further comprising filtering to remove any undissolved said polymer from said liquid composition.

15. The liquid composition prepared by the process of claim 1, 2, 3, 4, 5, 6, 7 or 14.

16. The liquid product prepared by the process of claim 8, 9, 10, 11 or 12.

17. The liquid composition or product prepared by the process of claim 13.

18. A process of casting the liquid product prepared by the process of claim 8, 9, 11 or 12 into the form of an unsupported membrane, leaching by washing with water, and drying.

19. A process for making a liquid composition of a perfluorinated ion exchange polymer having —SO$_3$M functional groups wherein M is H, Na, K or NR$_4$, and each R is separately H, CH$_3$ or C$_2$H$_5$, in a liquid medium, said liquid composition being liquid at room temperature, said process comprising contacting a said polymer having an equivalent weight in the range of 1025 to 1500 with the lower density liquid phase recovered from a process of claim 1 in combination with a mixture consisting essentially of 20 to 90% by weight of water and 10 to 80% by weight of at least one member of the group consisting of methanol, ethanol, n-propanol, isopropanol, n-butanol, 2-butanol, 2-methoxyethanol, 2-ethoxyethanol, ethylene glycol dimethyl ether, ethylene glycol diethyl ether, diethylene glycol dimethyl ether, diethylene glycol diethyl ether, dioxane and acetonitrile at a temperature in the range of about 180° to 300° C. and below the critical temperature(s) of said member(s) employed, for at least 0.5 hour in a closed vessel, and separating from said liquid composition any lower density liquid phase present.

20. The process of claim 19 wherein said contacting is with water, at least one of n-propanol and isopropanol, and a said lower density liquid phase which comprises mixed propyl ethers, n-propanol and isopropanol.

21. A process for making a liquid composition of a perfluorinated ion exchange polymer having —SO$_3$M functional groups, wherein M is H, Na, K or NR$_4$ where each R separately is H, CH$_3$ or C$_2$H$_5$, in a liquid medium, said liquid composition being liquid at room temperature, said process comprising contacting a said polymer having an equivalent weight in the range of 1025 to 1500, with a mixture consisting essentially of about 90 to 99% by weight water and about 1 to 10% by weight of at least one member of the group consisting of methanol, ethanol, n-propanol, isopropanol, n-butanol, 2-butanol, 2-methoxyethanol, 2-ethoxyethanol, ethylene glycol dimethyl ether, ethylene glycol diethyl ether, diethylene glycol dimethyl ether, diethylene glycol diethyl ether, dioxane and acetonitrile at a temperature in the range of about 240° to 300° C. for at least 0.5 hour in a closed vessel, and separating from said liquid composition any lower density liquid phase present.

22. A process for making a liquid composition of a perfluorinated ion exchange polymer having —SO$_3$M functional groups wherein M is H, Na, K or NR$_4$ where each R separately is H, CH$_3$ or C$_2$H$_5$, in water, said liquid composition being liquid at room temperature, said process comprising contacting a said polymer having an equivalent weight in the range of 1025 to 1500, with water at a temperature in the range of about 240° to 300° C. for at least 0.5 hour in a closed vessel.

23. The process of claim 22 wherein said liquid composition contains up to 10% by weight of said polymer.

24. The process of claim 23 wherein said polymer, prior to said contacting, is in the form of fluff, cubes, tubing, coating on a substrate, or at least a portion of film or membrane.

25. The process of claim 24 wherein said polymer has an equivalent weight in the range of 1050 to 1250.

26. The process of claim 22, 23, 24 or 25 wherein said polymer having —SO$_3$M functional groups is a copolymer of tetrafluoroethylene and perfluoro(3,6-dioxa-4-methyl-7-octenesulfonyl fluoride) whose sulfonyl fluoride groups have been converted to —SO$_3$M functional groups.

27. A process for separating a first perfluorinated ion exchange polymer having —SO$_3$M functional groups wherein M is H, Na, K or NR$_4$, and each R is separately H, CH$_3$ or C$_2$H$_5$, said first polymer having an equivalent weight in the range of 1025 to 1250, from a second perfluorinated ion exchange polymer having —COOQ functional groups wherein Q is H, lower alkyl, Na, K or NR$_4$ where each R is separately H, CH$_3$ or C$_2$H$_5$, said second polymer having an equivalent weight in the range of 600 to 2000, which process comprises contacting material which contains both said first and second polymers with a liquid consisting essentially of 20 to 100% by weight of water and 0 to 80% by weight of at least one member of the group consisting of methanol, ethanol, n-propanol, isopropanol, n-butanol, 2-butanol, 2-methoxyethanol, 2-ethoxyethanol, ethylene glycol dimethyl ether, ethylene glycol diethyl ether, diethylene glycol dimethyl ether, diethylene glycol diethyl ether, dioxane and acetonitrile at a temperature in the range of about 180° to 300° C. and below the critical temperature of each component member of said liquid, for at least 0.5 hour in a closed vessel, and separating a liquid composition containing said first polymer from remaining solids by filtration or centrifugation.

28. The process of claim 27 wherein Q is H or lower alkyl, and said liquid composition containing said first polymer is separated from remaining solids which contain said second polymer.

29. The process of claim 27 wherein said material is a film having at least one layer of said first polymer and at least one layer of said second polymer.

30. The process of claim 29 wherein said film has been employed as an ion exchange barrier in an electrochemical process.

31. The process of claim 27 wherein said material is a membrane having at least one layer of said first polymer, at least one layer of said second polymer, and a reinforcing member.

32. The process of claim 31 wherein said membrane has been employed as an ion exchange barrier in an electrochemical process.

33. The process of claim 27 wherein said material contains a mixture of said first polymer and said second polymer.

34. A process for making a second liquid composition of a perfluorinated ion exchange polymer having —SO$_3$H functional groups in a liquid medium, said second liquid composition being liquid at room temperature, said process comprising contacting a perfluorinated ion exchange polymer having —SO$_3$M′ functional groups, wherein M′ is Na, K or NR$_4$ where each R separately is H, CH$_3$, or C$_2$H$_5$, and having an equivalent weight in the range of 1025 to 1500, with a mixture consisting essentially of about 20 to 100% by weight water and 0 to about 80% by weight of at least one member of the group consisting of methanol, ethanol, n-propanol, isopropanol, n-butanol, 2-butanol, 2-methoxyethanol, 2-ethyoxyethanol, ethylene glycol dimethyl ether, ethylene glycol diethyl ether, diethylene glycol dimethyl ether, diethylene glycol diethyl ether, dioxane and acetonitrile at a temperature in the range of about 180° to 300° C. and below the critical temperature(s) of said member(s) employed, for at least 0.5 hour in a closed vessel to form a first liquid composition, and then contacting said first liquid composition with a cation exchange resin in acid form to convert said first liquid composition to said second liquid composition.

* * * * *

UNITED STATES PATENT OFFICE
CERTIFICATE OF CORRECTION

PATENT NO. : 4,433,082
DATED : February 21, 1984
INVENTOR(S) : Walther G. Grot

It is certified that error appears in the above-identified patent and that said Letters Patent are hereby corrected as shown below:

Column 17, line 51, "comprising" should read

-- consisting essentially of --.

Signed and Sealed this

Fifth Day of June 1984

[SEAL]

Attest:

GERALD J. MOSSINGHOFF

Attesting Officer          Commissioner of Patents and Trademarks